LIQUID FUEL HEATER

Original Filed June 10, 1959 3 Sheets-Sheet 1

INVENTOR.
RICHARD J. BROWN

BY Richard H MacCutcheon

ATTORNEY

LIQUID FUEL HEATER

Original Filed June 10, 1959 3 Sheets-Sheet 2

INVENTOR
RICHARD J. BROWN

BY Richard H. MacCutchen
ATTORNEY

LIQUID FUEL HEATER

Original Filed June 10, 1959 3 Sheets-Sheet 3

INVENTOR.
RICHARD J. BROWN

BY

Richard H. MacCartney

ATTORNEY

United States Patent Office

Re. 25,970
Reissued Mar. 1, 1966

25,970
LIQUID FUEL HEATER

Richard J. Brown, Mentor, Ohio, assignor, by mesne assignments, to Test Institute Corp., a corporation of Ohio Original No. 3,086,579, dated Apr. 23, 1963, Ser. No. 819,446, June 10, 1959. Application for reissue Nov. 16, 1964, Ser. No. 427,197
11 Claims. (Cl. 158—28)

Matter enclosed in heavy brackets [ ] appears in the original patent but forms no part of this reissue specification; matter printed in italics indicates the additions made by reissue.

The present invention relates to improvement in heaters of the type arranged to provide warm air as for personnel comfort or cargo heating in vehicles, or to warm air or to warm a normal coolant for pre-heating of internal combustion engines of land, sea or air vehicles.

Some heaters adapted to burn volatile fuels have encountered one difficulty in the past in that the heaters were not fully operative when turned to any position. Further such heaters have not been adequately operative at very low temperatures, for example at −65° F. as encountered in the Arctic, particularly when using lower grade fuel such as kerosene, diesel engine fuel, or so-called Arctic compression-ignition fuel.

It is an object of the present invention to provide simple and inexpensive means for overcoming the above difficulties.

Another object of the invention is to provide improvements which permit heaters to be more compact and of lighter weight for a predetermined heat output per hour than heretofore.

Another object of the invention is to provide an improvement in burners which prevents the formation of clogging deposits to assure long dependable heater life.

Other objects and advantages will become apparent and the invention may be better understood from consideration of the following description taken in connection with the accompanying drawing in which.

Figure 1:
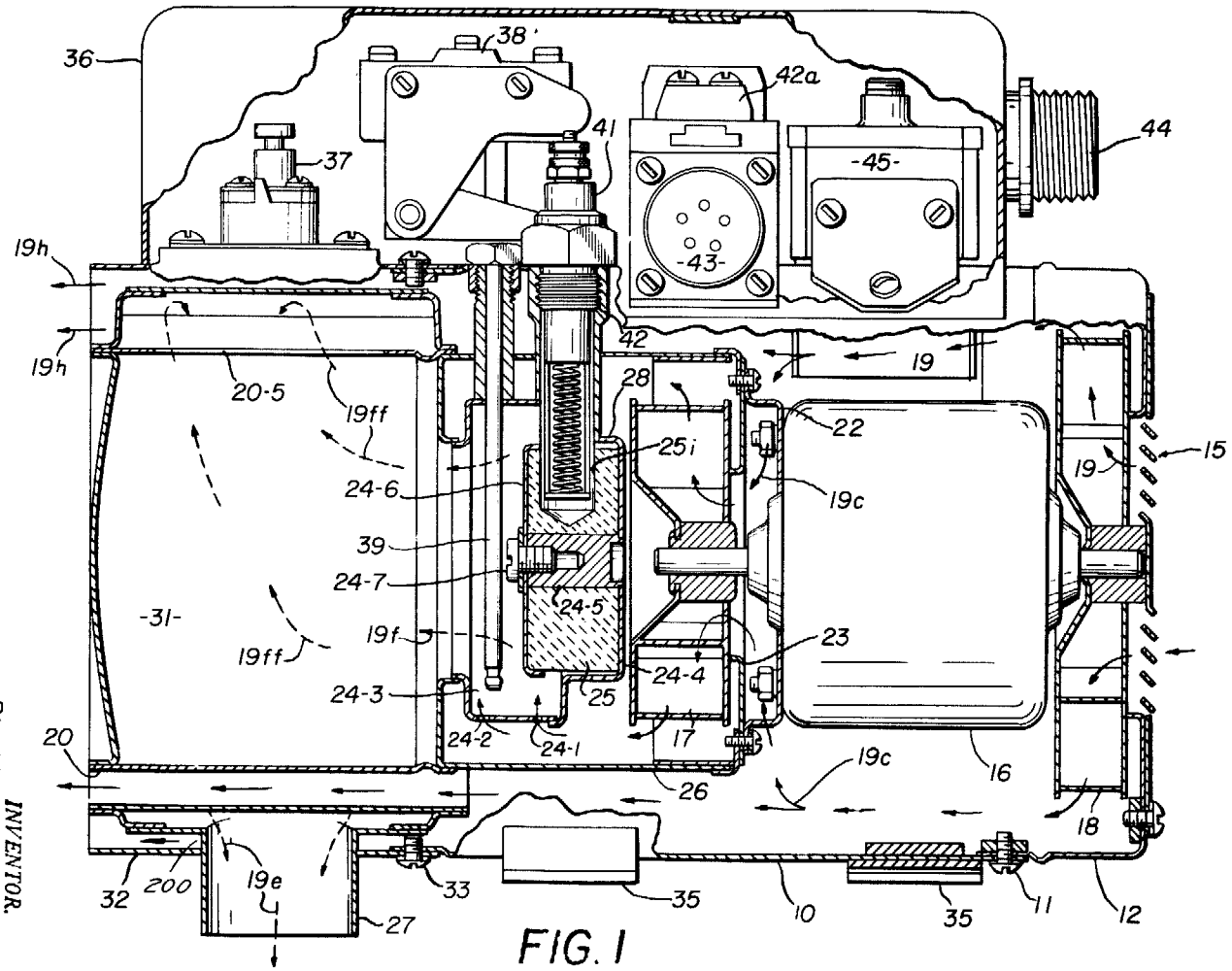
FIG. 1 is an axial section of a fresh air heater incorporating improvements according to the present invention, taken substantially on section line I—I of FIG. 4.
Figure 5:
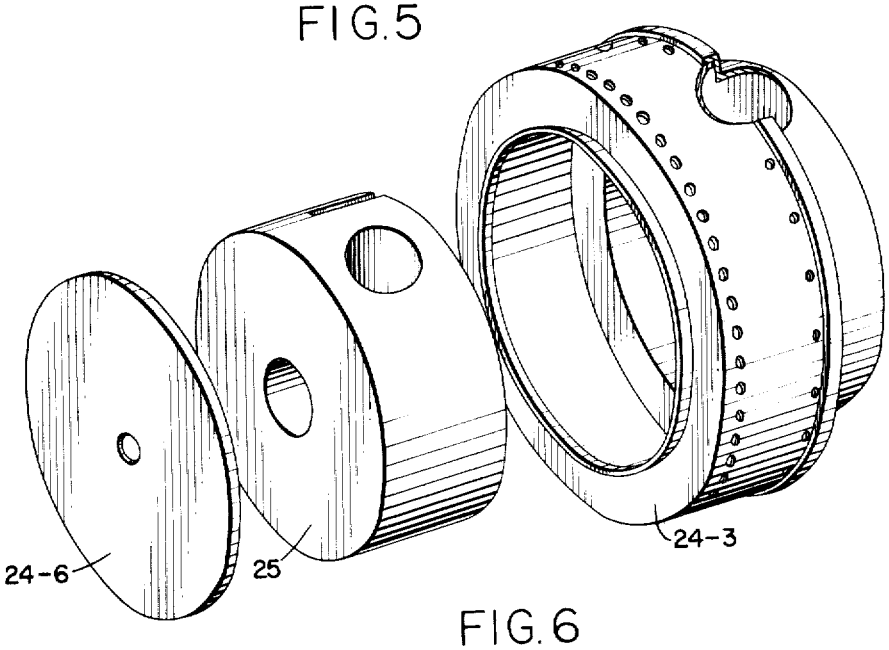
FIG. 5 is an exploded view of the heater burner assembly.

Referring first to FIG. 1 the heater may be provided with an annular outer shell 10 to one end of which is secured as by screws 11 an air inlet cover 12 to which can be attached either ducting from a remote fresh air source (not shown) or a screen (not shown) or a louvered cover 15 centrally of the end of cover 12.

An electric motor 16 at one end drives a combustion fan 17 hereafter referred to and at the other end drives a fresh air fan 18 which draws fresh air through the louvers of end plate 15 and discharges it radially outward and then axially through the heater as indicated by arrows 19. A major portion of this air eventually passes through tubes 20 of a heat exchanger and is finally discharged as heated air as indicated by the arrows 19h. Thereafter the heated fresh air may be carried from the heater of the invention by ducting (not shown) as to the interior of the carburetor, piston chambers, crank case and battery compartment of an interal combustion engine.

Figure 6:
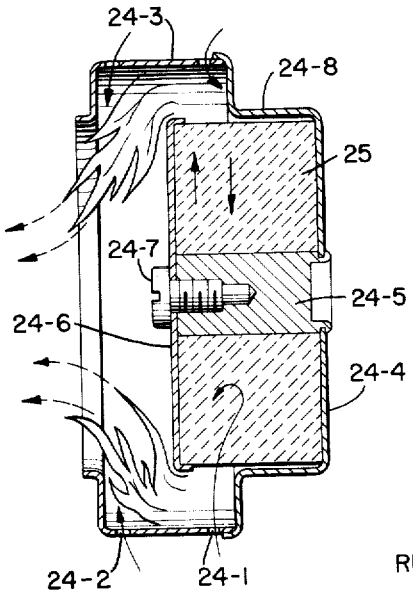
FIG. 6 is an assembled view of the burner assembly of the heater of FIGS. 1–4.
Figure 4:
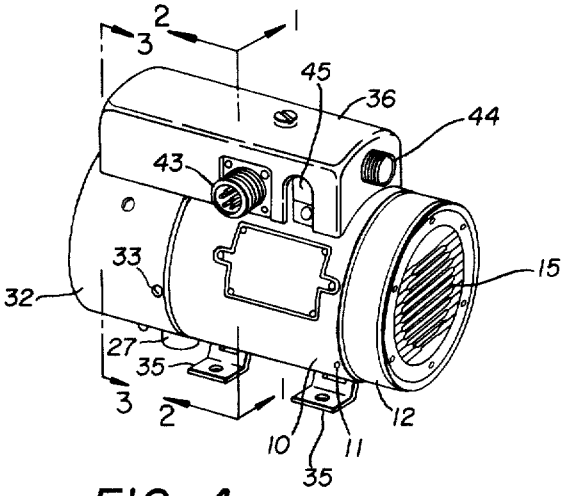
FIG. 4 is a perspective view showing the section lines for FIGS. 1, 2 and 3.

At the end of the motor 16 adjacent combustion fan 17 a perforate combustion air inlet plate 22 secures the motor and is supported by a shroud ring 23 having a central opening through which a portion of the air (for combustion) passes as indicated by the arrows 19c into the second stage fan 17 which discharges such air first radially outward and then axially and radially inward through primary (small) holes 24–1 and secondary (larger) holes 24–2 of an igniter chamber cylindrical shell 24–3 within which a ceramic block 25 is supported against a back plate 24–4 and around a center support 24–5 which may be silver soldered to 24–4, with the ceramic held in place by a substantially imperforate front retainer cover 24–6 and co-operating screw 24–7. If desired one of the plates (such as 24–4) may be continued on as an axially extending metallic cylindrical shell portion (24–8 in FIG. 6) which closely follows a portion of the periphery of the ceramic block (25), and may be continued on as an other axially extending metallic cylindrical shell portion (24–3) which is spaced substantially outward from another portion of the block periphery and has the primary holes 24–1 through which the air passes under pressure to act as jets having velocity sufficient to penetrate the block.

Figure 2:
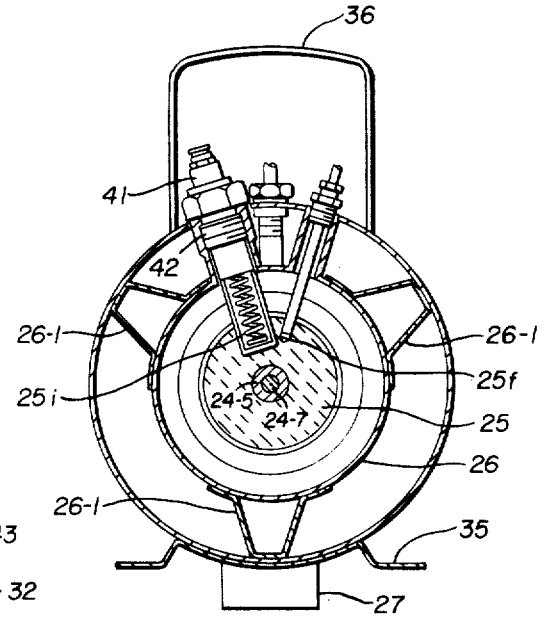
FIG. 2 is a sectional view through the heater shown in FIG. 1 taken on section line 2—2 of FIG. 4.

This whole burner chamber assembly 24–1—24–7 and the motor supporting shroud 23 and plate 22 are held in place by a mounting shell 26 supporting within the outer shell 10 by brackets 26–1 (see FIG. 2).

The ceramic block 25, which during operation always has some air pressure upon it, acts (at least until firing) as a mixer and vaporizer block in which combustion air is mixed with fuel and heated to ignition temperature as hereafter described, and, at first ignition, this heated mixture issues as flame 19f right off the block although during full firing the flame moves on down the machine about to the location of arrow 19ff (because the mixture is too rich to burn at the block).

Figure 3:
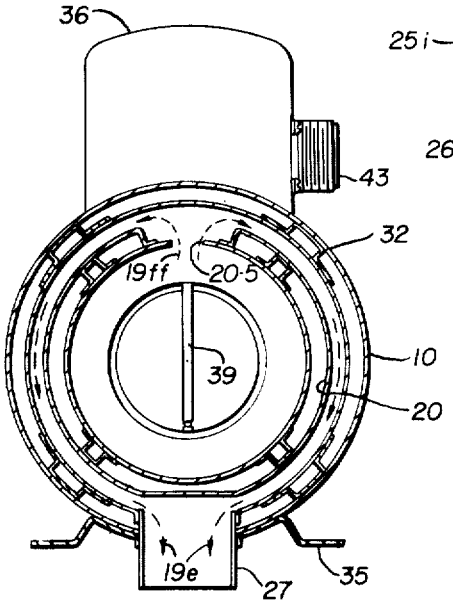
FIG. 3 is a sectional view of the heater shown in FIG. 1 and taken substantially on section line 3—3 of FIG. 4.

Ultimately the flame is discharged through an upper slot 20–5 in the tubing (see FIG. 3) and then it (or exhaust gases) passes 180° around the heater outside the heat exchanger tubes 20 and finally is discharged as exhausted products of combustion (arrow 19e) through an exhaust conduit 27.

A combustion chamber as indicated generally at 31 is formed within and about the heat exchanger tubes 20 and is shown doubly enclosed with an annular outer casing 32 secured to the central shell 10 as by screws 33 to form additional (double pass) outer fresh air conduits 200 with heated air (arrows 19h) issuing therefrom, and other more or less standard parts may include base mounting brackets 35 and an upper protective cover 36 enclosing, for example, a limit switch 37, a flame switch 38 which has a depending thermostatic element 39 extending into the initial flame path and for turning off the initial ignition heat causing means when flame has been established. The protective cover 36 also forms an enclosure for the porcelain end of a resistance type electrical glow plug element 41 which has a threaded portion engaging threads 42 associated with the main frame of the heater and has its resistance or heating end extending into the ceramic wick block through a radial hole 25i therein (see FIG. 2) so that adjacent parts of the block are heated to ignition temperature. The protective cover 36 may also enclose a terminal block 42a and support an associated quick disconnect type of coupling half 43, and it may support a threaded fuel inlet pipe connection 44 and enclose a fuel regulator 45 and internal piping (not shown) which conducts fuel from the inlet 44 through the valve 45 and then finally through a pipe which terminates in a radial bore 25f which is provided in the ceramic block 25 (see FIG. 2) somewhat adjacent the bore 25i.

The use of an easily replaceable annular wick block of ceramic provided with radial passage for the fuel feed and another radial passage for an electrical glow plug presents decided advantages both for preheating of fuel which permits ignition and burning any given fuel at lower ambient temperatures and as a consequence and also because of anti-clog features for permitting burning of heavier fuels at any given low temperature than heretofore possible. The arrangement also provides advantages of high heat output because of high wick capacity and high combustion efficiency due to good vaporization.

With the arrangement of the invention, that is with a ceramic block holding both glow plug and the fuel feed pipe termination, the ceramic acts both as a vaporizer, so that lighting may take place off of it, and as a heat source so that burning may take place off of it, and this is one factor that leads to less chance of congestion due to waxes, carbon, etc., because the wick acts not only to meter the fuel but also to assist in dissolving the impurities, although, if desired, additional such dissolving can take place in the fuel line, for example at a thin plate orifice in the fuel line adjacent the burner assembly and thus subject to its heat.

While any ordinary filter refractory material might be used for the ceramic, I have had good results using a medium grain fired refractory as those words are used for material furnished by the Wisconsin Porcelain Co., and I find such material greatly advantageous over the steel wool or asbestos wicks of the past and which by comparison with the ceramic block have very limited capacity and life.

With the heater of the invention, heated fresh air can be delivered instantly even with extremely compact, light weight and easy to install equipment, and the equipment is adequate even for long ducting systems.

There is thus provided a device of the character described capable of meeting the objects above set forth. When, for example, the heater is used to supply fresh warm air for the engine cylinders, carburetor, battery, etc. of military aircraft, and, as often required by military specifications, uses diesel fuel oil and operates at temperatures down to −65° F., a heater constructed according to the invention is capable of delivering 15,000 B.t.u.'s of fresh air heat per hour from equipment weighing less than ten pounds and operable at any angle, whereas with prior art equipment it was impossible to furnish any heat with such thick fuel at such low temperatures and the situation was even worse if the equipment were seriously inclined or upside down.

While I have illustrated and described a particular embodiment of my invention, various modifications may obviously be made without departing from its true spirit and scope which is intended to be defined by the accompanying claims taken with all reasonable equivalents.

I claim:

1. In a liquid fuel type heater apparatus, the combination of a ceramic block of granular fired porous refractory, said block having two relatively adjacent ports terminating therein and having a mounting means while being otherwise substantially imperforate except for the interstices between the refractory grains, a fuel supply pipe extending into and terminating in one of said ports, means for conveying fuel to said supply pipe whereby said fuel penetrates said porous block, means for conveying air under pressure to penetrate portions of the outer surface of said block adjacent said fuel supply pipe and thus to penetrate the block and mix therein with said fuel, an electrical glow plug assembly extending into and terminating in the other of said ports whereby to heat to ignition temperature said portions of the block which contain a mixture of said fuel and said air.

2. In a liquid fuel type heater apparatus, the combination as in claim 1 further characterized by the ceramic block having a peripheral face and at one side thereof a flat face and at the other side of said peripheral face a flat face which is downstream as regards the general flow of combustion products, a solid back plate substantially covering the first mentioned flat face of the ceramic block, and a solid front plate substantially covering the downstream flat face of the ceramic block to force air entering said block as well as vapor mixture for combustion and flame leaving said block all to take paths associated with the block peripheral face and between said solid plates.

3. In a liquid fuel type heater apparatus, the combination as in claim 1 further characterized by the ceramic block being annular with its mounting hole forming the central bore of the annulus while the block has an outer periphery and two flat faces each extending from said bore radially outward to said periphery, the block being of a medium grain fired refractory and having a pair of metallic plates each co-extensively engaging a different one of the block's flat faces and being imperforate thereagainst, one of said plates having an axially extending first metallic cylindrical shell portion closely following a portion of the block periphery and thereafter flaring radially outward and axially onward to define a second axially extending metallic cylindrical shell portion which is spaced substantially outward from a remaining portion of the periphery of the block, the means for conveying air to an outer surface of the block comprising an arrangement of peripherally spaced holes through the cylindrical shell portion which is spaced outward from the block whereby the holes serve to direct air to and through the block periphery while the spaces between holes permit of the escape of vapor mixture and flame from the block.

4. In a liquid fuel type heater the combination of claim 3 further characterized by the ports in the block extending radially inward from the periphery of the block and the glow plug and fuel supply pipe which terminate in said ports extending radially through at least one of the metallic shield axially extending portions for ease of maintenance of the equipment.

5. In a liquid fuel type heater the combination of claim 3 further characterized by the second axially extending metallic portion extending substantially beyond the axial length of the block and then turning radially inward to define a plenum throat, the outer diameter of said second axially extending portion adjacent said throat having second holes having greater cross sectional area than the first mentioned holes, and for providing secondary air adjacent said throat while away from said block.

6. In a liquid fuel heater of the type having means for conveying fuel, means for conveying air for combustion of said fuel, and electrically energized means for heating to ignition temperatures, a block which is annular about an axis and of porous fired refractory ceramic having a radially extending port terminating therein and accommodating the fuel conveying means, a radially extending port terminating in the block and accommodating the heating means, and a hollow bore for mounting said block, said block being otherwise substantially imperforate and exposed to the air provided for combustion, exposed to the heating means at its portions adjacent thereto, and exposed to the fuel whereby heat and fuel and air all penetrate said porous ceramic block, the fuel conveying means, air conveying means and heating means being configured and arranged with sufficient adjacency to assure that said air and fuel are mixed at a point ignition can take place due to heating to ignition temperature.

7. In a liquid fuel heater the arrangement as in claim 6 further characterized by a cylindrical casing arranged around while spaced radially outward from at least a portion of the periphery of said block and extending axially therebeyond, and the means for conveying air for combustion comprising small holes through said casing axially adjacent the block, and means for conveying additional air for combustion comprising larger holes axially beyond the block and for establishing efficient combustion in an area axially beyond the block.

*8. In a liquid fuel-type heater apparatus the combination of a granular porous refractory block having at least two opposed sides, means closing one of said sides to the entrance of air, said block having a portion encircling at least substantially the entire perimeter thereof between said sides and adjacent to said side opposite said closed side exposed to the entrance of air, means for dispensing fuel into said block for dispersion therethrough by capillary action, means for conveying air under pressure to said block to combine with the fuel therein to form a combustible mixture, and igniter means in the block arranged relative to said fuel dispensing means for igniting the fuel-air mixture.*

*9. An igniter for use in a liquid-type heater apparatus, the combination of a granular porous refractory block having at least two opposed sides, means closing one of said sides to the entrance of air, means disposed adjacent to the other of said sides of said block substantially closing the same, said block having a portion encircling at least substantially the entire perimeter thereof between said sides and adjacent to said side opposite said closed side exposed to the entrance of air, means for dispensing fuel into said block for dispersion therethrough by capillary action, means for conveying air under pressure to said block to penetrate said block and combine with the fuel therein to form a combustible mixture, and igniter means in the block arranged relative to said fuel dispensing means for igniting the fuel-air mixture.*

*10. An igniter for use in a liquid-type heater apparatus, the combination of a granular porous refractory block having first and second sides, means closing said first side to the entrance of air, an impervious plate disposed closely adjacent to the second side of said block and having an area approximating the area of said second side, said block having a portion encircling at least substantially the entire perimeter thereof between said sides and adjacent to said side opposite said closed side exposed to the entrance of air, means for dispensing fuel into said block for dispersion therethrough by capillary action, means for conveying air under pressure to said exposed portion of said block disposed between said first and second sides to penetrate said block and combine with the fuel therein to form a combustible mixture, and igniter means in the block arranged relative to said fuel dispensing means for igniting the fuel-air mixture.*

*11. In a liquid fuel-type heater apparatus the combination of a granular porous refractory block having first and second sides, means closing said first side to the entrance of air, an impervious plate disposed closely adjacent said second side and having an area approximating the area of said second side, said block having a portion encircling at least substantially the entire perimeter thereof between said sides and adjacent to said side opposite said closed side exposed to the entrance of air, means for supporting said block, means for dispensing fuel into said block for distribution therethrough by capillary action, means for conveying air under pressure to a portion of said block disposed between said first and second sides to penetrate the block and combine with the fuel therein to form a combustible mixture; igniter means in the block arranged relative to said fuel dispensing means for igniting the fuel-air mixture, and a plurality of apertures in said block to accommodate said support means, said fuel dispensing means, and said igniter means, said block being otherwise substantially imperforate except for the interstices between the refractory grains.*

References Cited by the Examiner

The following references, cited by the Examiner, are of record in the patented file of this patent or the original patent.

UNITED STATES PATENTS

| | | | |
|---|---|---|---|
| 2,174,818 | 10/1939 | Brace. | |
| 2,199,777 | 5/1940 | Brace | 158—96 |
| 2,286,853 | 6/1942 | Holthouse | 126—110 X |
| 2,286,854 | 6/1942 | Holthouse | 158—280 X |
| 2,386,746 | 10/1945 | Hess | 158—96 |
| 2,447,373 | 8/1948 | Smoot | 158—96 X |
| 2,685,335 | 8/1954 | McCutcheon | 158—94 |
| 2,775,293 | 12/1956 | Raymond et al. | 158—96 X |
| 2,779,398 | 1/1957 | Brown | 158—28 X |
| 2,879,837 | 3/1959 | Downs | 158—96 |

JAMES W. WESTHAVER, *Primary Examiner.*